F. Washbourne.

Bit Screw.

N° 84,663.   Patented Dec. 1, 1868.

Witnesses
E. T. Kastenhuber
Chas Wahlers

Inventor
T. Washbourne
pr
Von Santwoord & Hauff
Atty's

F. WASHBOURNE, OF NEW YORK, N. Y.

*Letters Patent No. 84,663, dated December 1, 1868.*

IMPROVEMENT IN SCREWS.

The Schedule referred to in these Letters Patent and making part of the same.

*To all whom it may concern:*

Be it known that I, F. WASHBOURNE, of No. 62 Reade street, in the city and State of New York, have invented a new and useful Improvement in Bib and other Screws; and I hereby declare that the following is a full, clear, and exact description thereof, which will enable those persons who are skilled in the art, to make and use the same, reference being had to the accompanying drawing, making part of this specification, in which drawing—

This invention relates to the construction of screws; and

It consists, among other things, in making the head and shank in separate pieces, and afterwards uniting them by soldering or brazing them together, the slot across the head being extended down into the top of the shank, so that in turning the screw with a screw-driver, the implement will take hold of the slot in the shank, and consequently the liability of wrenching off the head will be avoided.

Figure 1:
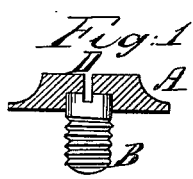
Figure 1 is an axial section of a bib-screw made according to my invention.
Figure 2:
Figure 2 is a cross-section of the head, as it appears after it is brought to the required shape, and before it is united to the shank of the screw.

In fig. 1, I have shown a bib-screw made according to my invention; and in fig. 2, I have shown a detailed sectional view of the head only, before it is slotted.

Figure 3:
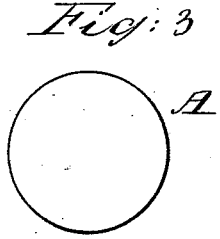
Figure 3 is a plan view of the blank from which the head is struck up.
Figure 4:
Figure 4 is a detailed view of the shank.

The said head, when made of wrought-metal, is formed or cut out, in the first place, to the shape of the blank shown in fig. 3, and is afterwards brought to the form shown in fig. 2, by suitable dies or formers, a recess, C, being, in the same operation, formed in the under side, in a central position, to receive the top of the shank B.

The blank from which the shank B is formed is attached to the head by inserting one end in the recess C, and soldering or brazing it to the head.

The screw-thread is formed on the shank after it is united to the head, but it may be formed previously, if preferred.

After the head and shank are firmly united to each other, I cut a slot, D, across the top of the head, to receive the end of a screw-driver, and I sink said slot down until it intersects the slot C, and enters the upper end of the shank B a sufficient distance to enable the screw-driver to take hold of the shank.

Bib-screws are now made by casting them, head and shank, in one piece; but screws so made are brittle, and liable to be easily broken, and a large percentage of metal is wasted in their manufacture. In addition to these disadvantages, their appearance is rough and coarse, compared with such as are made of wrought-metal according to my invention. Whereas my improved screws are of superior toughness and strength, and capable of more wear, and are less liable to break than those that are cast in one piece.

Having thus described my invention,

What I claim as new, and desire to secure by Letters Patent, is—

In a screw, the head and shank of which are made in separate pieces, extending the slot D in the head of the screw downwards into the shank, substantially as described.

In witness whereof, I have hereunto subscribed my name, this 13th day of January, 1868.

F. WASHBOURNE.

Witnesses:
J. VAN SANTVOORD,
JOHN C. POLLER.